(No Model.)
H. C. F. OTTE.
MEAT CUTTING AND FILLING MACHINE.
No. 498,940. Patented June 6, 1893.
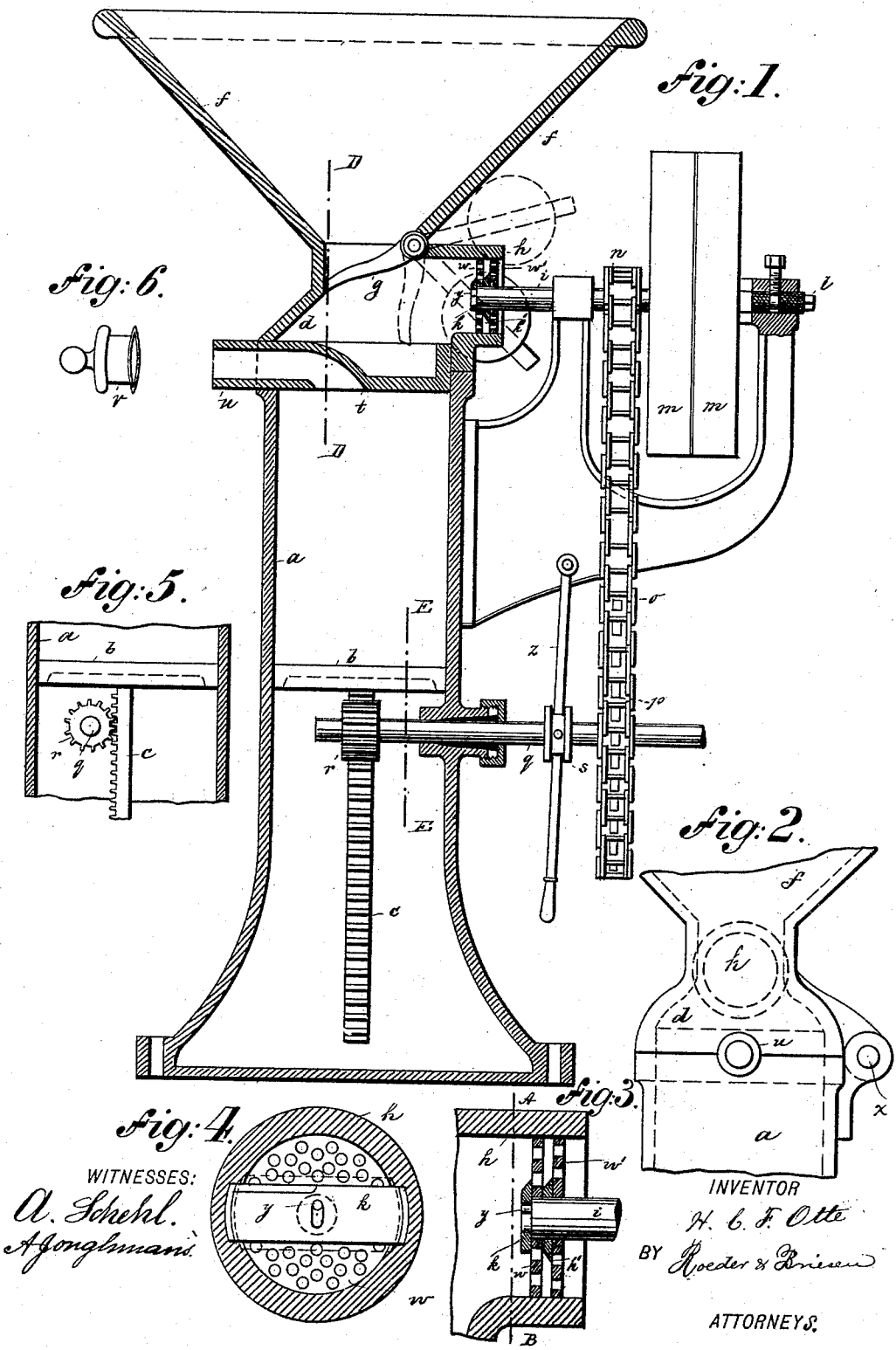
WITNESSES:
A. Schehl.
A. Jonghman
INVENTOR
H. C. F. Otte
BY Roeder & Brieven
ATTORNEYS.

UNITED STATES PATENT OFFICE.

HEINRICH CONRAD FRIEDRICH OTTE, OF ALTONA, GERMANY.

MEAT CUTTING AND FILLING MACHINE.

SPECIFICATION forming part of Letters Patent No. 498,940, dated June 6, 1893.

Application filed March 4, 1891. Serial No. 383,722. (No model.)

*To all whom it may concern:*

Be it known that I, HEINRICH CONRAD FRIEDRICH OTTE, a subject of the Emperor of Germany, residing at Altona, Germany, have invented new and useful Improvements in Meat Cutting and Filling Machines, of which the following is a specification.

Meat cutting machines heretofore ordinarily used, in which the meat is conveyed by endless screws to the cutting appliances, have the disadvantage of pressing the meat too much and squeezing out the juice so that raw meat is rendered inferior in appearance and also becomes unsuited for being preserved, while cooked meat cannot be treated in such machines at all. These drawbacks are obviated by the use of a machine according to my invention which moreover is capable of being rapidly converted into a sausage filling machine.

In the accompanying drawings Figure 1 is a longitudinal section, partly in elevation of the machine; Fig. 2 a cross section on line D D Fig. 1; Fig. 3 a longitudinal section through the cutters; Fig. 4 a cross section on line A B Fig. 3; Fig. 5 a cross section on line E E Fig. 1, and Fig. 6 an elevation of stopper $v$.

$a$ is a cylinder in which is arranged a piston $b$ that is capable of being actuated by means of a rack $c$ or other suitable device. The cylinder $a$ has a cover $d$ which turns on hinge $x$. Upon the cover is fixed a feed hopper $f$ which is ordinarily kept closed automatically by a flap $g$ provided with a counterweight. The capacity of the hopper is equal to the capacity of the cylinder $a$.

On the cover $d$ is arranged laterally a tube $h$ in which the cutting appliance is situated. This appliance consists of two perforated steel disks $w$ and $w'$ fixed on and rotating with a shaft $i$, and knives $k$ and $k'$ which are arranged in front of the disks and do not rotate, and of which the former $k$ has imparted to it a to and fro motion by means of an eccentric or eccentric pin $y$ (see Fig. 3). The shaft $i$ is driven by means of a crank $l$ or by belt pulleys $m$, as desired. The motion of the shaft $i$ also effects the advance of the piston $b$ and for this purpose there is fixed on the shaft, a chain wheel $n$ which through a chain $o$ and chain wheel $p$ drives a second shaft $q$ upon which is mounted a toothed wheel $r$ that engages with the rack $c$. Upon the shaft $q$ there is also arranged a clutch $s$ embraced by forked hand lever $z$ and by means of which the toothed wheel $r$ can be put in and out of gear.

To enable the machine to be used as a filling machine, the cover $d$ is thrown back and a cover $t$ is placed on the upper part of the cylinder $a$, this cover having a tubular part $u$ over which the skin to be filled is drawn. The opening for the tubular part is closed during the cutting operation by a plug or stopper $v$ (Fig. 6).

The operation of the machine is as follows: The meat to be cut is charged into the hopper $f$, and falls through the opening in its lower part (the flap $g$ being opened by the weight of the meat) into the cylinder $a$ the flap $g$ then closing automatically. The toothed wheel $r$ is then thrown into gear, moving the rack $c$ and the piston $b$ upward. The meat is thus pressed into the holes of the disk $w$, (which are larger than those of the disk $w'$) and is cut off by the knife $k$. The meat thus cut up is then further pressed into the smaller holes of the disk $w'$, and cut off by the knife $k'$, whereupon it falls out of the tube $h$ in a finely cut condition, into a vessel placed to receive it. When the meat in the cylinder has been driven through the cutting device the piston is let down by throwing the toothed wheel $r$ out of gear, the cylinder $a$ again filled, and the operation of the machine repeated until all the meat to be treated has been cut up. Then the cover $d$ is opened, the cylinder $a$ filled with cut up meat, the cover $t$ inserted, the piston $b$ moved up, and the meat pressed through the tubular part $u$ into the skin which is slipped over that part.

Having now particularly described and ascertained the nature of this invention and in what manner the same is to be performed, I declare that what I claim is—

1. A combined meat cutting and filling machine comprising a cylinder $a$, a piston $b$ for forcing forward meat to be treated, a removable cover $t$ having a tubular nozzle $u$, a work shaft $i$, and cutting devices mounted on said shaft, substantially as specified.

2. The combination of cylinder $a$ with piston $b$ and with a knife $k$ and a shaft $i$ having an eccentric pin $y$ that engages and reciprocates the knife, substantially as specified.

3. The combination of cylinder $a$ with shaft $i$, cutters secured thereto, a piston $b$, within cylinder $a$, and with a rack $c$, pinion $r$, chain wheels $p$, $n$, and chain $o$, for transmitting the motion of the shaft to the piston, substantially as specified.

In testimony whereof I have signed my name to this specification in the presence of two subscribing witnesses.

HEINRICH CONRAD FRIEDRICH OTTE.

Witnesses:
W. H. ROTH,
MAX FOUGUET.